Jan. 30, 1968  R. A. PFLUGER ET AL  3,365,806
BULK FREEZE-DRYING METHOD AND APPARATUS
Filed Aug. 8, 1966  5 Sheets-Sheet 1
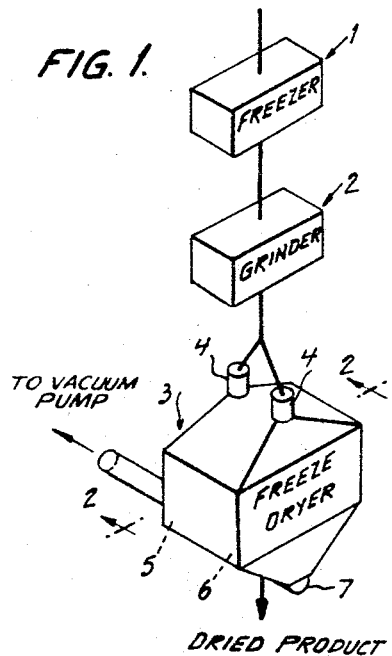
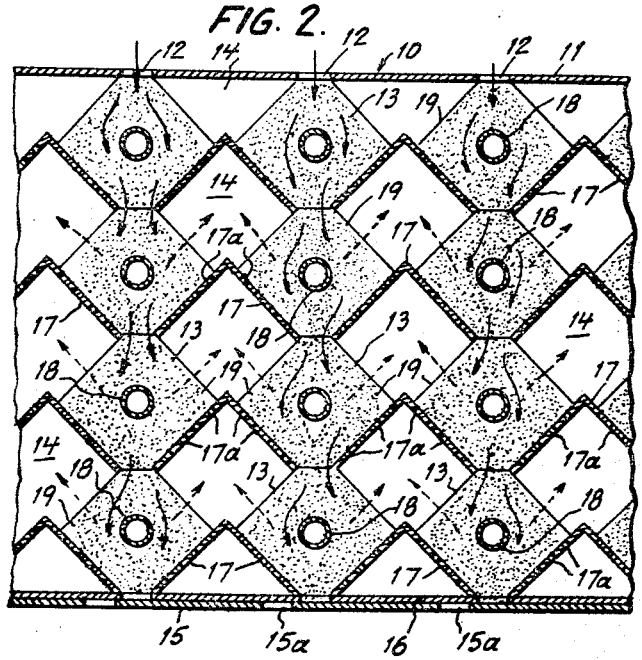
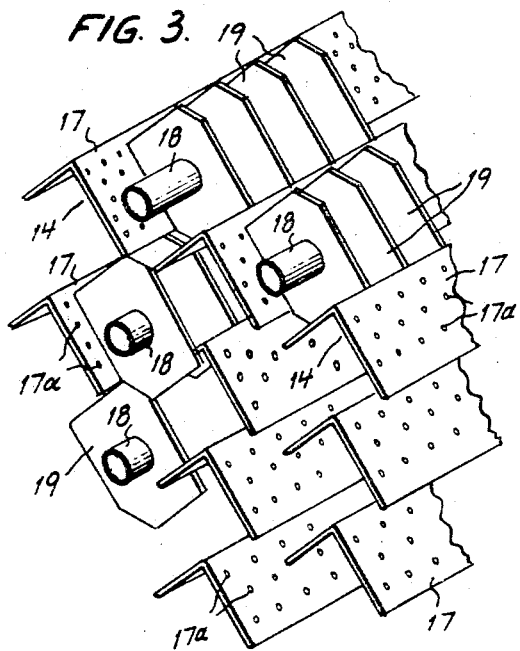
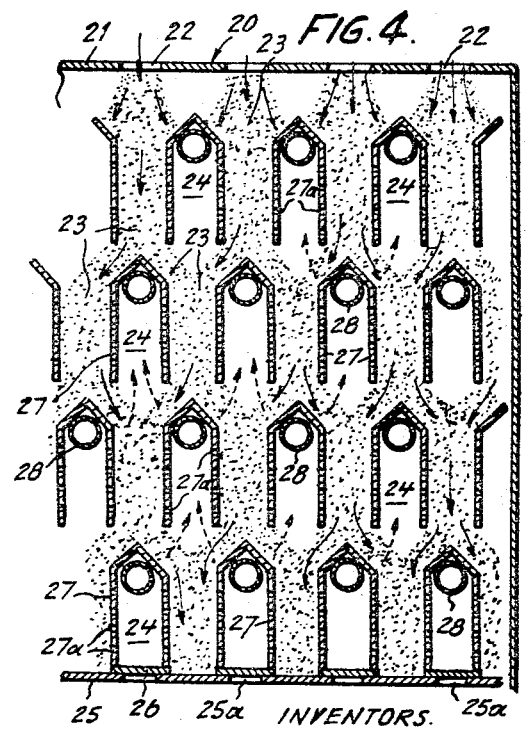
INVENTORS.
RICHARD A. PFLUGER
JOHN F. EWALD JR.
BYRON E. ELERATH
BY LeFevre, Guillemont & Hatton
ATTORNEY Jan. 30, 1968  R. A. PFLUGER ET AL  3,365,806
BULK FREEZE-DRYING METHOD AND APPARATUS
Filed Aug. 8, 1966  5 Sheets-Sheet 2
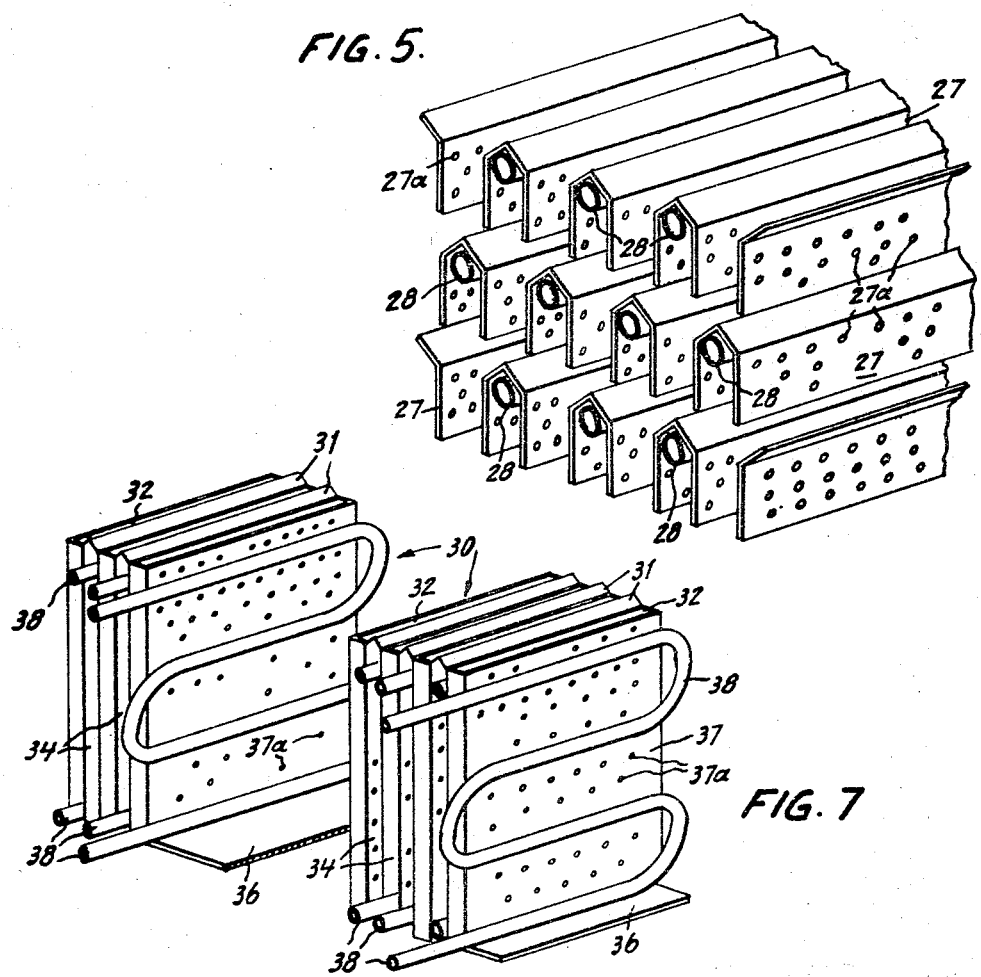
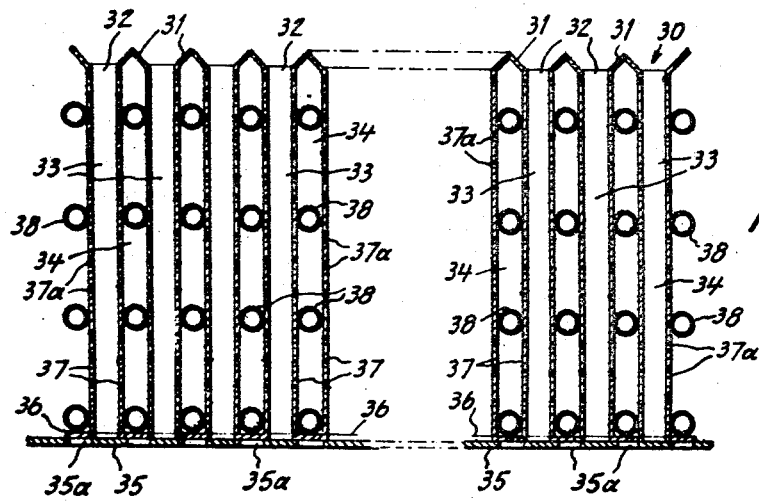

Jan. 30, 1968 R. A. PFLUGER ETAL 3,365,806
BULK FREEZE-DRYING METHOD AND APPARATUS
Filed Aug. 8, 1966 5 Sheets-Sheet 3

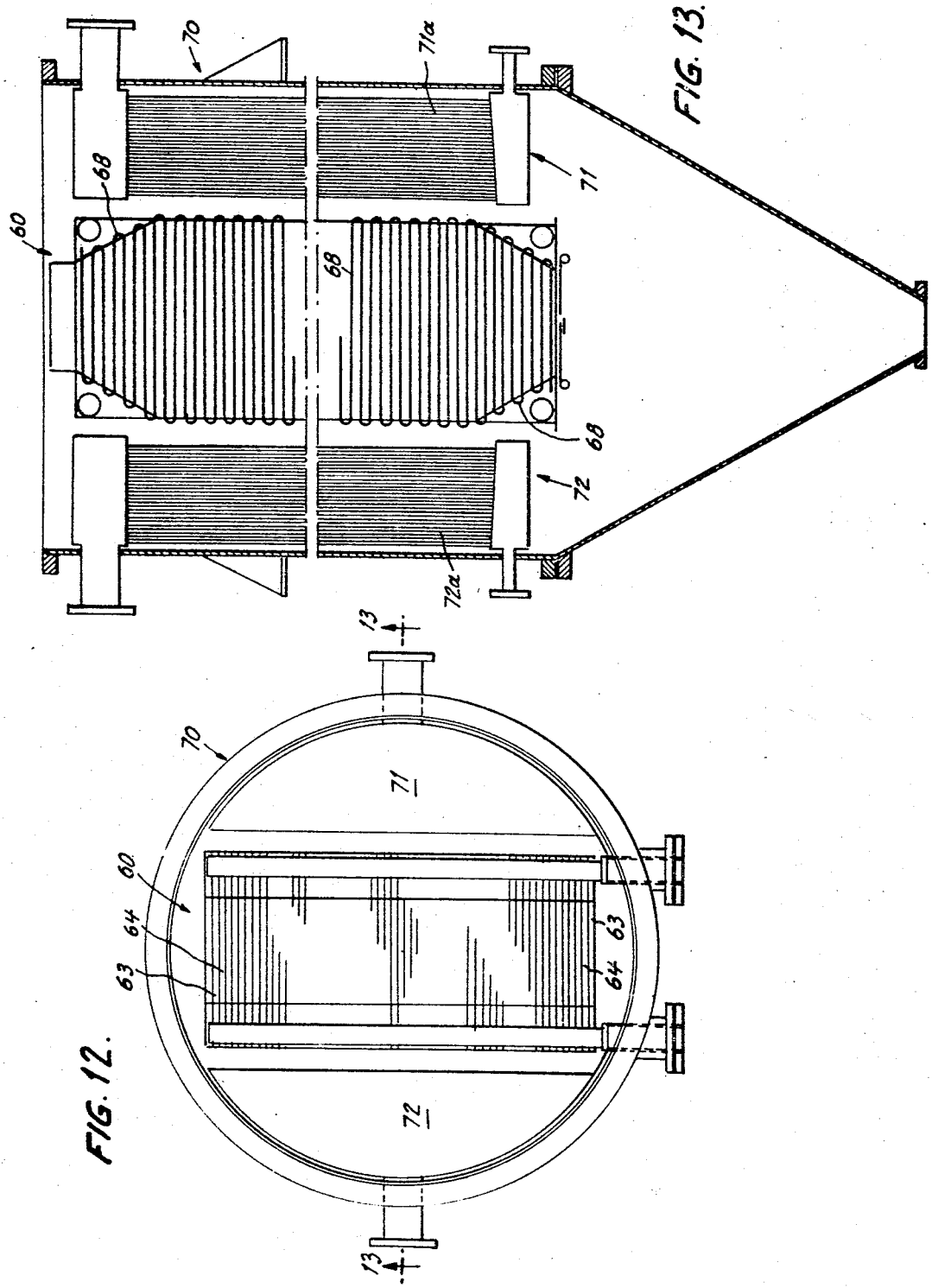

United States Patent Office 3,365,806
Patented Jan. 30, 1968

3,365,806
BULK FREEZE-DRYING METHOD AND APPARATUS
Richard A. Pfluger, Maplewood, John F. Ewald, Jr., New Milford, and Byron E. Elerath, Mountain Lakes, N.J., assignors to General Foods Corporation, White Plains, N.Y., a corporation of Delaware
Filed Aug. 8, 1966, Ser. No. 570,953
16 Claims. (Cl. 34—5)

ABSTRACT OF THE DISCLOSURE

Apparatus for a continuous or batch method of vacuum freeze-drying frozen granular material in spaced, substantially vertical product beds is provided by vertical cell units designed for this purpose. Sublimed water vapors are conveyed from the product beds to the condensing area by the open spaces between said product beds. These open spaces can also contain heating means for supplying heat of sublimation to the frozen material within the product beds.

---

This invention relates to an improved process and apparatus for vacuum freeze-drying of granulated frozen material in bulk form.

In conventional freeze-drying, the vacuum chamber is usually charged by distributing the frozen material which has been reduced to a granular subdivided form in a series of trays which rest on heated shelves disposed within the chamber. Vacuum is then drawn on the chamber and thermal energy is applied to the material by circulating a heated liquid in the shelves which causes the moisture in the product to be sublimed directly into the vapor phase. The vaporized water is then condensed on refrigerated surfaces located either within the chamber or outside the chamber and connected by a duct or pipe to the chamber. Irwin, Jr., 2,292,448, and Abbott et al., 3,132,930, show this method of drying. Various suggestions have been made for improving the drying system generally and, more specifically, to avoid manual handling of trays when drying large quantities of material, such as food. One such method involves transporting the frozen material by means of a belt through an elongated vacuum chamber which has vapor locks for introduction and removal of the granular material (Colton, 2,751,687). Another method involves passing a finely-divided frozen material through a vapor lock onto a series of heated cascading plates in a vacuum chamber whereby the frozen material is distributed as a monolayer of particles which continuously change their surface configuration and are dried rapidly (British Patent 948,517, issued to Basic Vegetable Products, Inc.).

However, prior art approaches all have the disadvantage that the equipment and process is not capable of efficient handling of the granular material in bulk form. The tray method requires a great deal of manual labor in loading and unloading the trays, whereas the continuous freeze-drying methods of Colton and the British patent operate on a monolayer bed concept which greatly restricts the capacity or yields of the system.

It is therefore a principal object of this invention to freeze-dry materials in bulk form with a minimum of manual labor being necessary to load and unload the dryers.

It is another object of this invention to increase the product capacity of existing vacuum chambers without increasing the size of said chambers.

It is another object of this invention to freeze-dry large quantities of heat-sensitive material in shorter periods of time.

It is another object of this invention to load and unload freeze-drying equipment by gravity.

It is another object of this invention to avoid the entrainment problem inherent in present freeze-drying systems.

It is another object of this invention to avoid abrasion or attrition of the frozen particles as they are being dried.

Still another object of this invention is to generally provide higher production capacities by either batch or continuous freeze-drying.

It has now been discovered that the objects of this invention can be accomplished by providing a vacuum freeze-drying system whereby a frozen, granular material is distributed by gravity into a series of spaced vertical product beds, supplying sufficient vacuum and heat to said vertical product beds to sublime water vapor into the spaces separating said beds, and constantly removing the vapors in said spaces to a vapor condensing area until the granular material in said vertical beds is dried to a stable moisture content.

The embodiments of this invention will now be described by reference to the accompanying drawings in which:

FIG. 1 is a schematic drawing of a continuous freeze-drying system which can employ the vertical bed units of this invention;

FIG. 2 is a fragmentary sectional view taken along line 2—2 of FIG. 1 of one form of vertical bed unit which can be used;

FIG. 3 is an isometric view of this same unit;

FIG. 4 is a fragmentary sectional view of an alternate vertical bed unit design taken along line 2—2 of FIG. 1;

FIG. 5 is an isometric view of this same unit;

FIG. 6 is a fragmentary sectional view of still another vertical bed unit design taken along line 2—2 of FIG. 1;

FIG. 7 is an isometric view of this same unit;

FIG. 12 is a plan view of a vertical bed unit which is of stationary design; and FIG. 13 is a sectional view of this unit taken along line 13—13.

Figure 11:
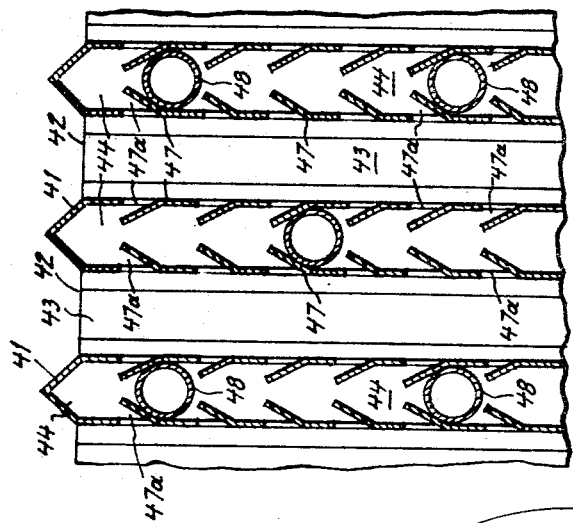
FIG. 11 is a fragmentary sectional view of the vertical bed unit of the bulk product car shown in FIG. 8 taken along line 11—11.

According to this invention there is provided a process for more efficient freeze-drying of heat-sensitive material by freezing said material to below its eutectic point, the material being in a granular particle form, gravity-distributing said granular material in bulk form into a series of vertical product beds which are equally spaced from one another, supplying sufficient vacuum and heat to these vertical product beds in order to sublime water vapor into the open vertical spaces which separate these beds and constantly removing these vapors to a vapor condenser area until the granular material in the vertical beds is dried to a stable moisture content.

Freeze-drying as used in this context means sublimation of water under reduced pressure conditions and with heat of sublimation being supplied by some external source and transmitted to the frozen product by either conduction or radiation, usually conduction. Eutectic point means that temperature at which all the water present in a material is frozen as well as mixtures of water and other materials. It is that temperature at which the material to be dried is completely frozen and represents also the temperature which must not be exceeded during sublimation or some melting of the product will occur.

The vertical product beds may take various different forms as long as the beds permit a gravity-distribution of the frozen charge of material in a series of spaced vertical cell units having adjacent vapor spaces which separate each cell and provide easy vapor escape to the condensers. The cells may be parallel and equally spaced from one another in a series of aligned, elongated rectangular cells separated by vapor removal spaces of the same shape or may take the form of vertical product beds which alternately converge or diverge in parallel or non-parallel fashion separated by vapor removal spaces. Heat of sublimation may be supplied to the frozen granular product either from within the vertical product bed or from without the vertical bed (from the vapor removal spaces). For coarse material (above 1/8" diameter) wherein the bed provides open channels for easy vapor escape, the heating means can be placed within the bed whereas for finely ground material having no open channels, the heating means are preferably placed outside the product beds (within the vapor removal spaces). The process can be applied in a continuous or batch manner and the vertical units can be stationary or movable to and from the vacuum chamber. Preferably, heat of sublimation is provided to the frozen product by conduction although some radiant heat is also transmitted to the product. In view of this, there should be good contact between the heating means, the vertical cell walls and the product to be dried. In a continuous system the product would enter a freeze-dryer by means of vapor locks and exit from the freeze-dryer by vapor locks with the vertical cell units of this invention distributing the product within the freeze-drying unit. In the batch system, the vapor cell units of this invention would be placed on a product car adapted to be transported into and out of the freeze-drying chamber or be placed within a stationary vertical chamber capable of being operated in a batch manner. Generally, it has been found that for most granular material, whether it be in the form of a powder or coarse grains, a product bed thickness of between 1/2" to 1", and preferably 5/8" to 7/8", a vapor removal space thickness of 1/4" to 1/2" and a cell width of 30" to 40" is suitable for overall freeze-drying efficiency. Cell height can vary from 20" to more than 5'.

The invention also provides apparatus for freeze-drying of granular frozen material comprising means for introducing a charge of frozen and granular material in bulk form into a series of aligned, substantially vertical product retaining walls, each wall being permeable to water vapor removal and being separated from adjacent product retaining walls by open spaces which have substantially the same height as said wall; means for sealing the product and apparatus from the atmosphere; vacuum means for lowering the pressure to assure sublimation of water into said spaces; means for removal of water vapor, and means for the removal of water vapor from the open spaces.

The apparatus can be adapted to both continuous and batch use requirements. In the continuous system the vertical product retaining walls are incorporated in a freeze-drying chamber having means for continuously introducing and discharging the frozen granular material in the freeze-drying chamber. The vertical product retaining walls may take the form of a series of elongated substantially rectangular cells, the walls of each cell having openings therein for passage of water vapor into corresponding vapor spaces of about the same dimension which separate each cell from one another. The heating means for developing heat of sublimation within the frozen product may be placed either within the product bed or within the vapor removal spaces depending on the particle size and the nature of the material to be dried. Preferably, the heating means are placed within the vapor removal spaces in order not to impede flow of product in the product beds and the heating means should contact the cell walls to promote conduction heating to the product. Here also the vertical product retaining walls may take the form of parallel rectangular walls, aligned troughs, angled receptacles, etc.

Referring now to FIG. 1, a schematic diagram of a continuous freeze-drying unit is shown. The product to be freeze-dried enters freezer unit 1 which lowers the temperature of the product to below the eutectic temperature of the material to be dried. This material may be either in liquid or solid form prior to being frozen. If the material is not in granular form, it enters grinder 2 for subdivision into a granular particle form. Subdivision of the frozen product may be quite large since a coarse granular product is often desired. Quite large means pieces of about the thickness of the product bed. Preferably pieces of above 3/16" in diameter are the maximum used, however, larger items such as whole shrimp, blueberries, etc. can be used. The product then enters the continuous freeze-dryer unit 3 through a series of vapor locks 4 and the material is distributed by gravity in a vertical cell unit similar to one of the three embodiments shown in FIGS. 2–7 in which the distribution of product is attained by gravity. The freeze-dryer may employ condenser units 5 and 6 which may be placed along the sides of the freeze-drying unit in a direction perpendicular to the vapor removal path or may be connected by a passageway to a condenser unit outside or separate from the freeze-drying chamber. Vapors from the vertical product beds are removed from the freeze-dryer area to the condenser area due to the use of cold condensers or other water absorbent, high vacuum (below 1000 microns, preferably below 500 microns) and an external heat source to supply heat of sublimation. The product, when dried, is removed from the freeze-dryer through vapor lock 7 for further processing at a filling or packaging station.

Various different forms of vertical cell units can be used in the continuous freeze-dryer of this invention. One such form of vertical cell unit is shown in FIGS. 2 and 3 wherein the vertical cell unit 10 is shown as having an upper wall 11 with openings 12 for entry of the product into a series of aligned vertical beds 13 which are in the general shape of troughs or squares disposed at 45° angle with the horizontal and separated by vapor removal spaces 14, also in the shape of squares at a 45° angle. A bottom wall 15 has exit openings 15a for controlling retention of the product and is connected to slidable wall 16 adapted to open and close the product exits 15a. The vertical cell units are formed from metal sheet material in the form of a series of vertically aligned angled members 17 which extend in a horizontal direction. The members 17 include vapor escape holes 17a and the upper part of the vertical bed unit 13 may include a metal screen (not shown) to prevent over-filling of product in the open space between angled members 17. Heating pipes 18 extend through the product beds 13 and are supported by heating fins 19 made of sheet metal having a good heat conductivity (aluminum) which extend through the bed (as shown in FIG. 3).

FIGS. 4 and 5 show another vertical bed unit 20 of modified form having an upper wall 21 with openings 22 for entry of product into the vertical cell unit. In this design, product beds 23 form around vapor removal spaces 24. Here also, product retaining walls on the bottom of the unit 25 and 26 determine discharge of the frozen product through exit openings 25a. In this design, the vertical cell units 27 are in the shape of an inverted U with small openings 27a for escape of water vapor from inside the product beds 23. The metal members 27 are staggered in this design but may be placed in vertical alignment if desired. The heating pipes 28 are placed inside the vapor removal space 24 and contact the upper portion of the metal member 27.

Still another vertical unit 30 is shown in FIGS. 6 and 7 wherein an upper wall 31 has openings 32 for admitting the charge of frozen material into the vertical cell unit. In this design the beds 33 are of elongated rectangular design and are separated by rectangular vapor removal spaces 34. A bottom wall 35 has exits 35a adapted to cooperate with slidable wall 36. The product retaining walls 37 have small openings 37a in the walls which permit evolved vapor from the frozen product to be transmitted to the vapor spaces 34 for transfer in a perpendicular path to the condenser unit where it can be removed from the system. The heating pipes in this unit are distributed throughout the vapor removal space 34 in the form of coils 38 which contact the metal walls 37 of the product bed for good heat conduction. The coils overlap the sides of the vertical unit 30 in order to allow an open space for passage of water vapor to the condenser units.

Figure 8:
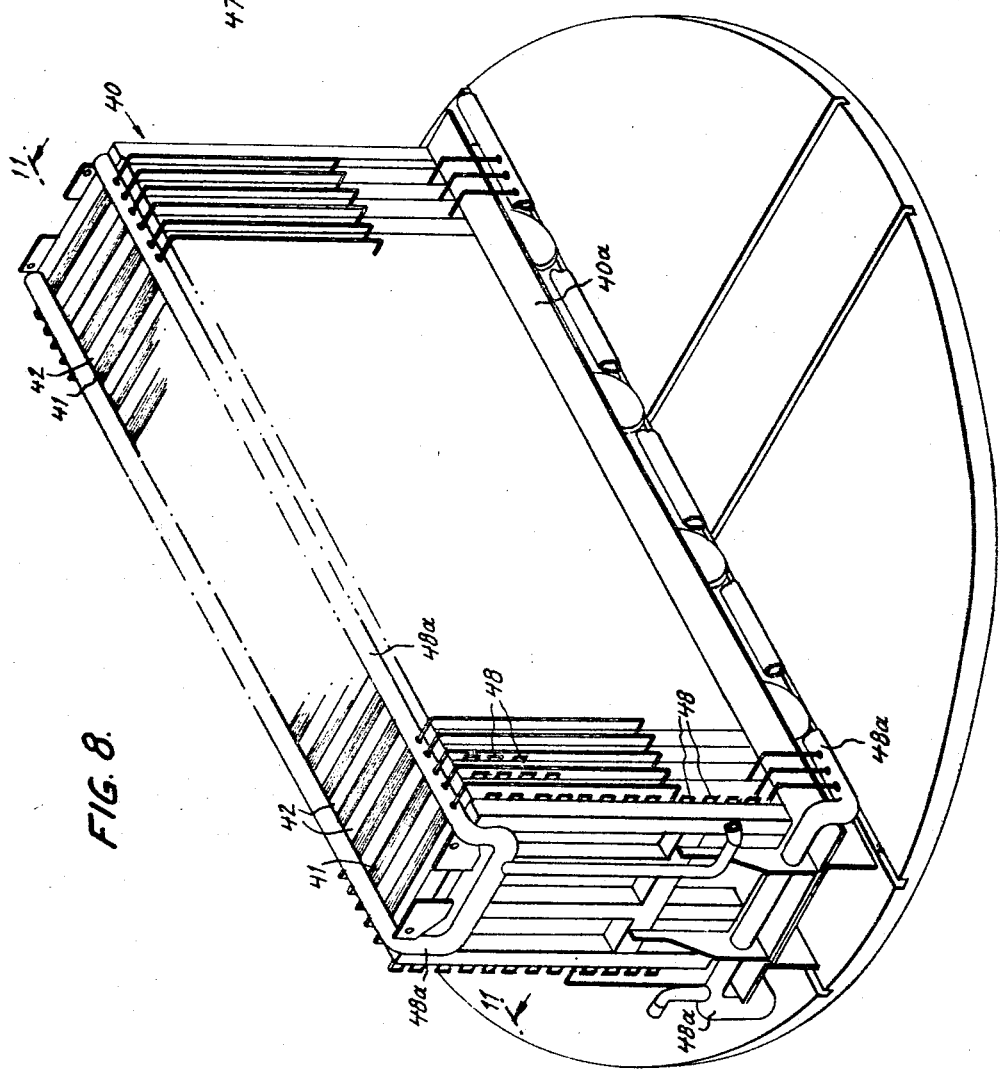
FIG. 8 is an isometric sectional view of a vertical bed unit as applied to a bulk product car which can be wheeled into or out of a freeze-drying vacuum chamber.
Figure 9:
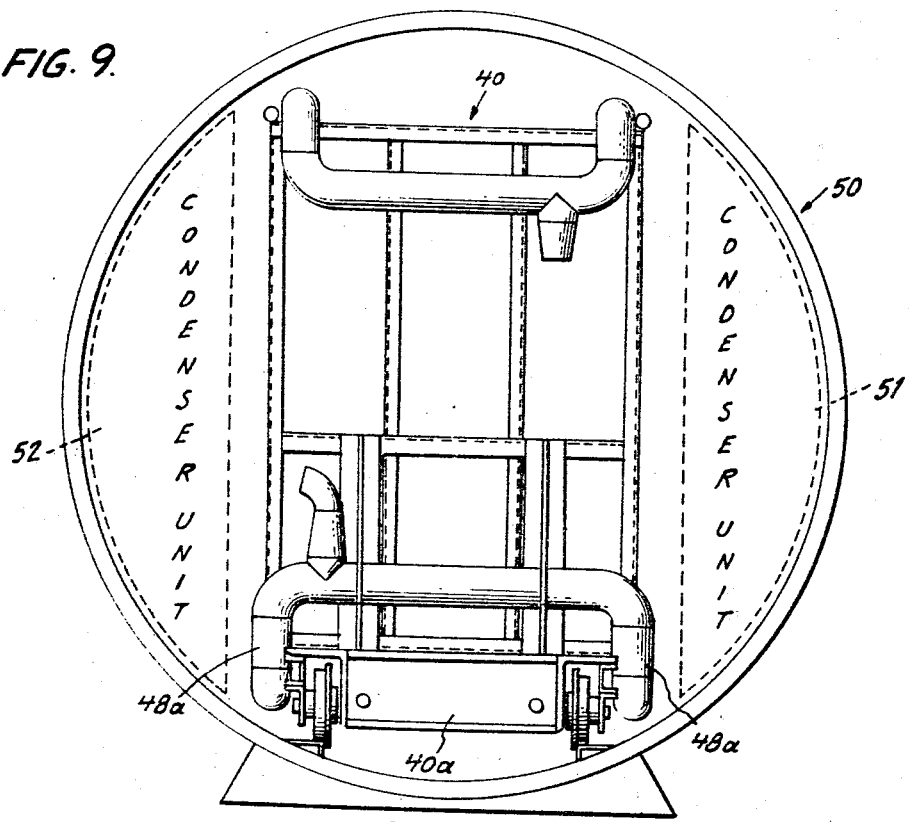
FIG. 9 is a front elevational view of the bulk product car in a vacuum chamber.
Figure 10:
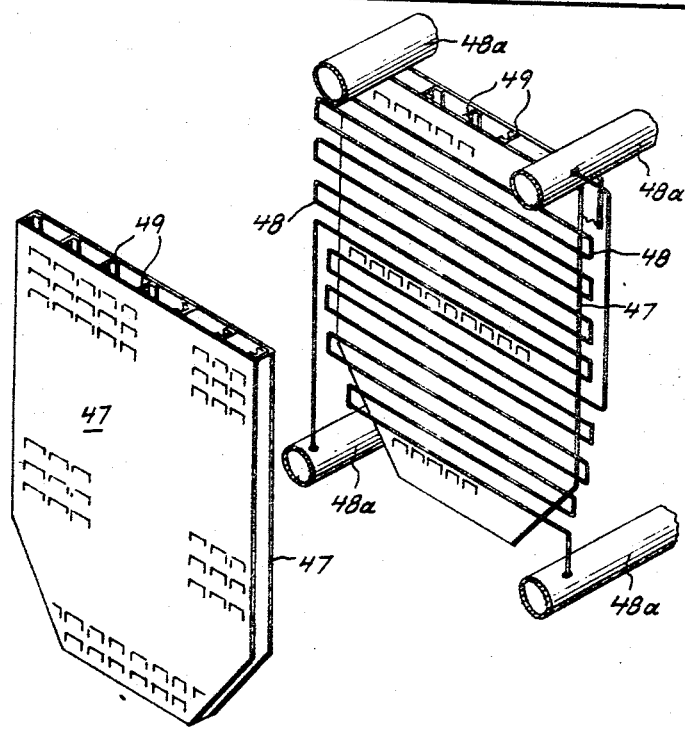
FIG. 10 is a fragmentary isometric view of the vertical product bed and the heating coils used in the bulk product car.

The described vertical cell units, while ideally adapted for continuous use in a freeze-drying system, can also be readily adapted to a batch system by placing the vertical cell unit 40 on a bulk product car as shown in FIGS. 8–11. In FIG. 8 the vertical cell unit 40 is placed on a car 40a having wheels adapted to travel on track means into a suitable vacuum chamber. Cell unit 40 is essentially a modified form of cell unit 30 shown in FIGS. 6 and 7. Upper wall 41 has openings 42 which reveal a series of elongated rectangular product beds 43 separated by vapor removal spaces 44. Product is retained in the vertical beds by gate means not shown but which may be similar to that of FIGS. 2–7. FIGS. 10 and 11 show that the rectangular product beds 43 are formed from heat conductive sheet metal walls 47 having louvred openings 47a for escape of water vapor into the vapor removal paths 44. The walls 47 have inclined top portions which seal the vapor removal spaces 44 and prevent entry of the frozen product into these spaces. Brackets 49 can be used to reinforce the product retaining walls 47. Heating coils 48 are distributed throughout the vapor removal spaces 44 of the vertical unit and are connected to main thermal pipes 48a. The coils 48 overlap the sides of the vertical unit since they contact the product walls 47 and therefore must allow an escape of water vapor out the sides. The bulk product car when filled with product can be wheeled into a suitable vacuum chamber 50 for freeze-drying of the product as shown in FIG. 9. In this particular chamber the condenser units 51 and 52 are placed on the sides of the chamber and the vapor removal paths or spaces 44 are positioned perpendicular to the condenser area.

Still another embodiment of the vertical cell units shown in FIGS. 6 and 7 is illustrated in FIGS. 12 and 13. In this embodiment, the vertical cell unit 60 is integral with a stationary vacuum chamber 70 having the general shape of a vertical cylinder as shown in FIG. 12. Condenser units 71 and 72 are shown on opposite sides of the cylinder in the form of a group or series of vertical individual pipes or tubes 71a and 72a. The vertical cell unit is composed of a series of spaced rectangular product beds 63 which are separated by vapor removal spaces 64 of substantially the same design. As in the other designs, the vertical product beds 63 and the vapor removal spaces 64 are positioned perpendicular to the condenser areas 71 and 72 for easy removal of water vapor of the product bed. Heating coils 68 are placed within the vapor removal spaces 64.

Having shown the general arrangement of the essential elements in the above drawings, it will be seen that regardless of the particular design or arrangement of the vertical cell unit or whether it be used as a continuous freeze-drying system (as shown in FIG. 1), a batch system (as shown in FIGS. 8–13), movable unit (as shown in FIGS. 8–11) or stationary unit (as shown in FIGS. 12 and 13) that the frozen granular product enters at the top of the vertical cell unit and exits at the bottom of this unit (the cell unit having a preferable thickness of ½" to 1") after being dried within the spaced product beds separated by vapor removal spaces (the spaces having a thickness about one-half that of the product beds) positioned perpendicular to the condenser area. The product may be dried in a static manner or may be dried while the bed is moving in a controlled manner. Both methods provide for gentle handling of the product.

Referring now to FIGS. 2–7, it is seen that the three units described are ideally suited for any batch or continuous freeze-drying. While the bed designs are similar in some respects, it should be noted that they are also quite different in some basic requirements which will depend on the nature, size and physical form of the material to be dried. The unit 10 shown in FIGS. 2 and 3 has peculiar utility in regard to drying large-sized granular material which forms a non-compact product bed having open channels or paths for easy removal of evolved water vapor from the interior portions of the bed. Generally, product having a natural dimension or granulated to a dimension of ⅛" or above will provide this open type of product bed. When drying this type of material, the heating pipes 18 can be placed directly within the product bed 13 without danger of melting the frozen product or causing recondensation of evolved vapors on the frozen material present in the exterior portions of the product bed. If finely-divided material which forms a more compact bed having no open channels for easy escape of evolved water vapor is desired to be dried, then the heating means 18 must be placed within the vapor removal spaces 14 and this design should be modified accordingly. This design is capable of being used in a continuous or batch manner with product entering through opening 12, being distributed by gravity in the vertical beds 13 and then exiting through exit openings 15a.

The vertical cell unit 20 shown in FIGS. 4 and 5 is ideally suited for drying finely-divided material since the heating coils 28 are placed within the vapor removal spaces 24 and are adapted to transmit heat of sublimation to the product bed by conduction through metal walls 27 to the product beds 23. Product enters through openings 22, is distributed by gravity in the various U-shaped product beds 23 and then is discharged from the unit by gravity through exit openings 25a. In this design each row of units 27 is not in vertical alignment with the succeeding row but they could be. This would then give a unit quite similar to the FIGS. 6 and 7 unit.

FIGS. 6 and 7 show the most practical arrangement for drying a finely-divided material since vertical cell unit 30 provides an unrestricted path for both the product to be dried and the evolved vapors. The product enters through openings 32 and is easily distributed within the rectangular product beds 33 in preparation for the drying cycle. Heating coils 38 which may be of any size and shape but preferably contact the walls 37 to provide good heat conduction are placed within the vertical removal spaces in order to avoid obstructing the product path. Finely-divided or coarse material can be dried in this particular arrangement. This unit, like the other two shown, can be employed in a continuous or stationary freeze-drying unit or can be placed on a product car which can be transported into or out of a vacuum chamber positioned some distance away from the product loading zone.

In FIGS. 8–12 the vertical cell unit 40 is placed on a bulk product car 40a wherein frozen granular product is loaded onto the product car by gravity by means of a hopper or other suitable charging device which eliminates the need for manual handling of the frozen granular material. Product enters the elongated rectangular beds 43 which are spaced from one another by vapor removal spaces 44 which have heating coils 48 distributed therein. Here also, the heating coils overlap the sides of vapor removal space 44 so as not to seal the vapors within the unit. Product is simply loaded by gravity onto the car with the unloading gate (not shown) at the bottom of the car being closed and the car, after being charged with the frozen material is wheeled from the loading zone into a freeze-drying chamber 50 as shown in FIG. 9. Condenser units 51 and 52 are positioned on either side of the bulk product car for condensation of evolved water vapor. The bulk product car once placed within the vacuum chamber 50 has heating pipe 48a connected to a flexible heating source by coupling 48b, the chamber is closed, a suitable vacuum (usually below 500 microns is drawn) and external heat of sublimation gradually applied to the frozen product by virtue of thermal fluid within the heating coils 48 distributed in the vacuum removal spaces 44. Heat is transmitted to the frozen product by conduction through the louvered walls 47. Due to the joint application of vacuum and heat, moisture is sublimed from the product beds 43 as vapor and exits through the openings 47a into the adjacent vapor removal paths 44 and exits from the vertical cell unit in a perpendicular direction toward the condenser area. The louvers are so arranged to prevent entry of granular or powdered product into the vapor removal spaces. Louvered openings of 0.5 to 3 mm. preferably 1 mm., have been found suitable for most materials. In this arrangement there is little or no impedance to the molecules of water vapor as they are released from the product bed. The vapors condense on the condenser surfaces and are removed from the system. Freeze-drying is continued in the conventional manner until the frozen product is reduced to a stable moisture content. The bulk product car is then removed from the vacuum chamber and the dried product is simply discharged from the bottom of the car onto a suitable product receiver for further processing or packaging. The most suitable dimension or size of the vapor removal spaces and the vertical product beds can be easily determined for each particular material to be dried. For less than 8 mesh (U.S. Standard Sieve) granular material, it has been found that a bed thickness of ½" to 1" and a vapor space thickness of about one-half that of the product bed is suitable. For frozen coffee granulated to below −8 mesh, a ⅝" bed thickness and a ⅜" vapor path thickness has been found ideal. In order to prevent entrainment of the small particles in the bed, the bed height should be at least five times its width.

Still another alternate process variation is shown in FIGS. 12 and 13. However, in this design the vertical cell unit is stationary within a cylindrical vacuum chamber. Frozen granular product is loaded onto the vertical cell units from the top of the chamber 70 and discharged at the bottom through exit 75 after being dried. This design is similar to the FIGS. 8–11 design and FIGS. 6 and 7 designs wherein the series of spaced rectangular product beds is shown with the vacuum removal path being in a perpendicular direction to the condenser area. In this unit, the ice from the condensers can be easily removed from the system during the defrost cycle through exit 75. This design may be converted to a continuous system very easily by providing for alternating use of external condensers during the drying cycle and by the provision of continuous removal of ice from the bed by means of vapor locks and the use of vapor locks for entry and exit of product.

This invention will now be described by reference to several specific examples.

*Example I*

The feasibility of the FIGS. 2 and 3 vertical cell unit was shown by placing this unit on a movable car. The vertical unit 10 had 8 individual horizontal rows of cells of ⅛" thick aluminum, arranged as 2 horizontal columns each having 4 cells in vertical alignment. Each individual cell was 4" square and was placed in the cell unit at a 45° angle with the horizontal to form a trough or product holding receptacle, with the bottom of the cell being cut away to allow transfer of product in a vertical direction to the next succeeding cell. Heating tubes 18 with thermal fluid inside and having an outer diameter of 1½" were placed in the center of each cell. The overall dimension of this vertical cell unit was 20" in height, 10" wide and 40" long. Heating fins 19 attached to the heating tubes in order to provide heat transfer to the frozen product, gave 40 compartments in each cell. Screens were placed longitudinally on the upper side of the cells to prevent product shift or flow into the vapor removal area 14. Thickness of the product bed (heating fin spacing and vapor path) was about ¾". The unit was designed so that metal and heating fluid occupied 12% of the space within the vacuum chamber while the product occupied 38% and the vapor passages 50%.

Coffee extract having a solids concentration of about 26% was frozen to below its eutectic point of −13.5° F. in the form of ½" thick slabs by means of a freezing belt. The frozen extract was then ground to below 8 mesh (U.S. Standard Sieve) to provide a particle distribution of between 8 mesh and 200 mesh. The below 20 mesh fraction was screened from the product and amounted to about 30% by weight of the product. The 8 to 20 mesh fraction of frozen granular extract was then placed in a vertical cell unit by charging the unit at the top and having each cell filled by gravity. The filled cell unit was then placed in a freeze-drying chamber similar to that shown in FIG. 9 with condenser units along each side of the elongated vacuum chamber. The vacuum chamber was sealed to atmosphere and pressure reduced to about 300 microns in 15 minutes. Glycol was circulated through the heating pipes according to the following profile: 0 to ½ hour, −30° F.; ½ to 2 hours, 50° to 140° F.; and 2 to 12 hours, 140° F. Pressure was maintained at below 300 microns during drying and the condenser temperature was between −30° F. and −60° F. At the end of this period, the product was dried to 0.7% terminal moisture by weight and no melt-back of frozen extract occurred during the drying cycle. The drying rate was equivalent to 35 lb. product per hour per 100 cubic feet (space occupied by the drying cart and contents, not including condenser space). Samples of the product revealed that no recondensation of vapor occured on the granular particles in the bed. The system showed the feasibility and advantage of eliminating the high manual labor requirements in the tray system of freeze-drying.

Product which had been ground to between 8 mesh and 200 mesh and not screened when dried according to the above procedure did not dry adequately since the coffee was found to melt around the heating tube and evolved vapors were recondensed on the frozen particles in the outer portions of the bed. The below 20 mesh particles appeared to be impeding vapor escape by filling the void spaces in the bed thus causing melt-back and recondensation.

*Example II*

A vertical cell unit according to the FIGS. 6 and 7 was built having a series of 40 vertical product beds 19" high, 21" long (width) and ½" in thickness. Each product cell was louvered for vapor escape according to FIG. 11. The louvers were ⁹⁄₁₆" long and provided a ¹⁄₁₆" opening. There was ¼" between the louvers horizontally and they were placed on ½" vertical centers. The heating tubes 38 containing thermal fluid were of ⅜" outer diameter and were placed on 3" centers within the vapor removal space 33 with the coiled portion of the tube overlapping the sides to provide vapor escape. The heating coils contacted the walls 37 to provide good conductivity to the frozen particles in bed 33.

Extract was then frozen as in Example I, ground to below 8 mesh, placed in the cell and freeze-dried in a vacuum chamber equipped with condensers at the sides of the vapor removal spaces. After freeze-drying at 110° F. heating fluid temperature for 10 hours, a condenser temperature of −35° F. and a vacuum of 200–500 microns mercury the product was found to have less than 1% moisture and no wet-spots or melt-back.

When cell units were increased in thickness to ¾", 18 hours was required to dry the same product and a unit of 0.9" took 24 hours to dry.

*Example III*

A larger sized bulk dryer was used in this example. Cells were 56" high, 40" in length (width) and 5/8" in thickness. 144 cells were placed in series and separated by vapor removal spaces of 3/8" according to FIGS. 8–11. Louvers similar to those of Example II (shown in FIG. 11) were cut in the product walls 47 and heating coils of 3/8" outer diameter were placed on 2" centers within the spaces 44. This cell was adapted to occupy 20% of the space within the vacuum chamber while the product occupied 50% and the vapor passages 30%.

Concentrated extract having a solids level of 35% was frozen to below its eutectic point and ground to between 8 and 200 U.S. Standard Sieve. The vertical cell unit 40 having an outline occupying 200 cubic feet was then filled by gravity from the top, placed in a 12' long freeze-dryer chamber having a total volume of 500 cubic feet and equipped with internal condensers adjacent the sides of the chamber as shown in FIG. 9. The chamber was closed to atmosphere and a pressure of 350 microns mercury was drawn on the chamber. Condenser temperature of the units 51 and 52 was lowered to between $-30°$ F. and $-42°$ F. The heating fluid temperature was raised from 30° F. to 150° F. in the first 2 hours of drying, held at 150° F. until the 6th hour and then lowered to 105° F. until the 9th hour. Vacuum was kept at below 350 microns and the condenser temperature was maintained below $-30°$ F. The product was dried to 1.2% by weight moisture. The car, on removal from the chamber, was found to unload easily and to be entirely dry. Productivity was 67 lbs. of product per hour per 100 cubic feet of space occupied by the car and contents.

In an alternate procedure, the thermal fluid temperature was raised to 160° F. in 1½ hours, held at this temperature for 4 hours and then lowered gradually to 105° F. Condenser temperature was kept below $-30°$ F. and a vacuum of less than 350 microns was maintained. This heating profile provided a drying time of 8½ hours to reach a terminal moisture content of 0.9%. Productivity in regard to water vapor removal was 1.27 lbs. per hour per cubic foot. This unit could now produce over 1300 lbs. of freeze-dried coffee in a drying cycle as compared to 600–700 lbs. when using the conventional tray method. Each cycle required the same time of 8½ to 9 hours. This was due to the increase of product by the vertical cells within the same area used by the trays, to increased vapor escape paths and to the fixation of product in the bed so that it could not entrain.

In this specification and claims it is understood that the thickness of the product bed is used to represent the smallest dimension of the product bed and the dimension wherein vapor removal to the open vapor spaces is accomplished. This dimension is substantially smaller than the vertical height, or length (width) of the bed.

Reference may now be made to the appended claims for a proper definition of the invention.

What is claimed is:

1. A process for bulk freeze-drying of heat-sensitive material which comprises freezing said material to below its eutectic point, said material being in a granular particle form; gravity distributing a charge of said frozen and granulated material in bulk form into a series of substantially parallel, equally spaced, vertical product beds, each bed having a thickness which is smaller than the height and length of said bed and insufficient to impede flow of water vapor therein; supplying vacuum and heat to said vertical product beds to sublime water vapor through said beds into the vertical spaces separating said beds, and constantly removing the vapors in said spaces to a vapor condensing area until the granular material in said vertical beds is dried to a stable moisture content.

2. In the process of claim 1, continuously distributing the frozen material into said vertical product beds, drying the material as it passes through said bed, and continuously discharging said material from said vertical beds.

3. In the process of claim 1, charging the vertical product beds by gravity, drying said material while in static form, and discharging said material from said bed by gravity.

4. The process of claim 1 wherein the beds alternately converge and diverge relative to the vertical plane.

5. The process of claim 1 wherein the beds are substantially rectangular in shape, parallel to the vertical plane, and substantially perpendicular to the horizontal plane.

6. The process of claim 5 wherein the beds are ½" to 1" in thickness and the vapor removal space is ¼" to ½" in thickness.

7. The process of claim 6 wherein heat of sublimation is applied to said vertical beds from said vapor removal spaces.

8. Apparatus for bulk freeze-drying of heat-sensitive material which has been frozen into a granular particle form comprising a series of aligned and substantially vertical product cells separated by open spaces having substantially the same height and length as said cells, said cells having opposed walls of relatively large surface area in relation to the thickness of said cells, said walls being permeable to free passage of water vapor into said open spaces; means for sealing said product walls from atmosphere; vacuum means for lowering the pressure in the open spaces adjacent to each product retaining wall to assure sublimation into said spaces; means for applying heat to provide heat of sublimation; means for removal of water vapor; and means for discharging said product from the vertical product beds by the force of gravity.

9. The apparatus of claim 8 wherein the vertical cells are in the form of a series of vertically aligned angled members which extend in a horizontal direction.

10. The apparatus of claim 8 wherein the vertical cells are in the form of elongated, substantially rectangular product retaining cells; the walls of said cells having a sufficient number of openings therein for free passage of water vapor to the open spaces.

11. The apparatus of claim 10 wherein the heating means are placed inside the rectangular product retaining cells without contacting the opposed walls of said cells.

12. The apparatus of claim 10 wherein the heating means are in the form of heated coils which extend throughout the vertical vapor removal space, said coils contacting the walls of adjacent cells in a substantially horizontal direction while leaving an open vertical space at the sides of said walls for free passage of water vapor from the vertical product cells to the condenser area and transmitting heat of sublimation to said walls and frozen product by conduction.

13. The apparatus of claim 12 wherein the vertical cells are spaced ¼" to ½" apart and the cells enclose a ½" to 1" thick product bed.

14. The apparatus of claim 12 wherein the cell walls are louvered to provide free passage of water vapor from said bed to the vapor space, said louvers being formed by a plurality of partially cut-away sections in said walls, said sections being attached at their bottom portions to the wall and extending inwardly and upwardly toward the vertical vapor space.

15. The apparatus of claim 14 wherein the louvers are 0.5 to 3 mm.

16. The apparatus of claim 14 wherein the louvers are about 1 mm.

References Cited

UNITED STATES PATENTS 1,207,763  12/1916  Jaeger _____ 34—92

FOREIGN PATENTS 28,775  4/1910  Sweden.

WILLIAM J. WYE, *Primary Examiner.*